Nov. 15, 1966     I. K. PURI     3,285,368
VIGILANCE CONTROL DEVICE FOR DIESEL AND ELECTRIC
LOCOMOTIVES AND AUTOMOBILE TRUCKS

Filed June 19, 1964     3 Sheets-Sheet 1

Inventor
INDER KUMAR PURI

By *Hammond & Littell*
Attorney

Nov. 15, 1966     I. K. PURI     3,285,368
VIGILANCE CONTROL DEVICE FOR DIESEL AND ELECTRIC
LOCOMOTIVES AND AUTOMOBILE TRUCKS

Filed June 19, 1964     3 Sheets-Sheet 3

Inventor
INDER KUMAR PURI

By Hammond & Littell
Attorney

United States Patent Office 3,285,368
Patented Nov. 15, 1966

3,285,368
VIGILANCE CONTROL DEVICE FOR DIESEL AND ELECTRIC LOCOMOTIVES AND AUTOMOBILE TRUCKS
Inder Kumar Puri, Rail Bhavan, New Delhi, India
Filed June 19, 1964, Ser. No. 376,431
7 Claims. (Cl. 180—82)

This invention relates to a vigilance control device for use in rail and road vehicles to control the alertness of the driver after short "time" or "distance" intervals.

Referring particularly to diesel or electric locomotives, the operation of which is simple, the factors of comfortable seating arrangement, dull purr of the engine, the dim-lit cab, the rhythmic click of the rails and long monotonous stretches of the road, tend to cause the driver to sleep.

Driving conditions prevailing on road trucks or buses when running on long distances are similar to those for diesel or electric locomotives, and particularly under monotonous running conditions or night driving when "Streamer Pattern" which helps in determining speed and motion, becomes very weak. At night the surroundings are totally obscure and only a patch of uniform straight road is visible under the head lights which lacks the depth in motion. The lighted portion of the road becomes dead spot of the "Streamer Pattern" in the driver's mind and thus the sense of motion is lost.

It is the object of this invention to propose a vigilance control device which will cause the functioning of warning signals at predetermined intervals and to provide means for resetting the device to its original position so that if the driver is not alert to reset the device, the said control device will cause cutting off of the fuel and/or power supply to the engine and also cause braking of the traction wheels.

The periodicity of the warning will be related to the cruising speed of the vehicle in such a manner that the driver gets the warning at an approximate interval of say 2 to 6 minutes. The adjustment of the time interval for each class of vehicle can be effected once for all through means adapted for driving the vigilance control device.

It is an important object of this invention, to ensure that the driver is not able to arrange permanent cancellation of the warning and braking cycle of the device in advance, thus removing the major drawback experienced with usual deadman's paddle or handle, commonly provided on locomotives.

The vigilance control device is operated from the traction wheels of the vehicle or through a clockwork mechanism or an electrical motor specially provided on the vehicle. Any of the said driving arrangements operates a gear wheel which in turn drives a cam. The cam has sequentially at least three sectors, one a free sector, second a warning signal sector and the third a power and/or fuel cut off and braking sector.

The cam is adapted to operate through the second sector, a first spring loaded contact rod and through the third sector, a second spring loaded contact rod. The first spring loaded contact rod when actuated by the cam operates an audio-visual warning system and the second spring loaded contact rod operates a device which cuts off fuel and/or power supply and causes braking of the vehicle. Then there is provided a solenoid in an electrical circuit and in the said circuit is included a vigilance control switch. When the said switch is closed, the solenoid circuit is closed energising the same. The shaft on which the cam is mounted is disposed within this solenoid. Thus on energisation of the solenoid, the cam shaft is drawn into the solenoid and the cam is disengaged from the gear wheel driving the same.

If the driver is alert, then as soon as he finds the audio-visual warning system operating, he will press the vigilance control button so that the came does not operate the second spring loaded contact rod and the cutting off of power or fuel supply and braking does not take place.

The cam and the gear wheel driving same are in frictional contact with each other. The gear wheel is freely rotatable on the cam shaft which is non-rotatable but is axially displaceable and when displaced, it causes the cam to be displaced with it.

The cam and the cam shaft are housed within a casing which has two auxiliary housings and in these housings extends the cam shaft. In one auxiliary housing is provided the solenoid and the other has a hydraulic or air damper. The cam shaft at the damper end is held by a spring so that when the solenoid is deenergised, the cam shaft is pulled back to its original position so that the cam comes in frictional contact with the gear wheel.

An important feature of the invention is the provision of an auxiliary contact which is closed by the displacement of the cam and the cam shaft when the solenoid is energised. This auxiliary contact when closed also causes the cutting off of fuel and/or power supply and braking. Thus if the driver deliberately closes the vigilance control switch, the solenoid will be energised causing displacement of the cam and closing of the auxiliary contact.

The cam may be of the box type and within this box is provided a winding spring whose inner end is connected to the cam shaft and the outer end is held against a stop in the cam.

The invention will now be more fully described with reference to the accompanying drawings in which.

Figure 1:
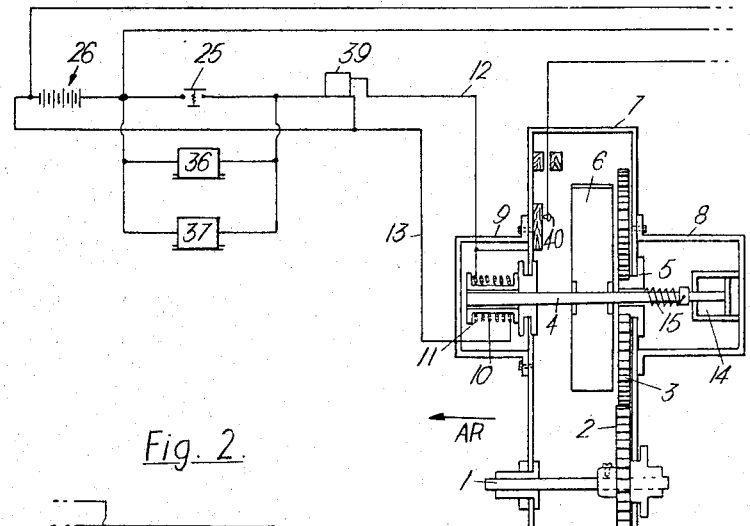
FIG. 1 shows schematically the vigilance control device in front elevation.

Referring to the device shown in FGS. 1 and 2, shaft 1 is operated either by a clockwork mechanism or by an electric motor or by traction wheels through a suitable reduction gear box (not shown). The shaft 1 carries a gear wheel 2 meshing with a gear wheel 3 mounted on a cam shaft 4. The gear wheel 3 is fitted on end bearing 5 so that it can rotate freely on shaft 4. The gear wheel drives a cam 6.

On the shaft 4 is also mounted the cam 6 in a manner that the cam turns freely on the shaft and is laterally displaceable with the shaft. The cam 6 may be of box structure with a cam profile on its periphery and its side facing the gear wheel 3 has friction surface. The inner face of gear wheel 3 is also made rough to function as friction clutch.

The gear wheel 3 and the cam 6 are housed within a casing 7 having auxiliary housings 8 and 9.

The shaft 4 extends at one end into a solenoid 10 mounted concentrically on a flanged sleeve 11. The solenoid 10 is housed within the housing 9 with lead wires 12 and 13 coming out of the said housing. On the opposite side, the shaft 4 extends into an air or hydraulic damper 14 and carries a spring 15 which is under compression. One end of the spring is fixed to the shaft 4 while the other end presses against the face of bearing 5.

Referring to the box cam 6, this is made retractable and includes a winding spring 16 whose inner end 17 is fixed to the shaft 4 and outer end 18 is held against the inside of a stop face 19 of the cam. Thus with the rotation of the cam, the spring 16 will be wound. The cam retracts to its original position by the unwinding of the spring. The shaft 4 is made non-rotatable and this can be done by providing a sliding key on the shaft 4 which key engages a fixed component such as the chamber of damper 14.

When the gear wheel 2 drives the gear wheel 3, then by frictional contact of cam with the gear wheel, the cam rotates, and causes the spring 16 to be slowly wound.

The profile of the cam is divided into three major sectors viz., free period sector X, warning sector Y and fuel and/or power cut off and braking sector Z.

The motion of the cam is required to give a predetermined time cycle consisting of free period, warning period and the fuel or power cut off and braking of the vehicle period. In the case of drive of the shaft 1 through an electric motor or the clock work mechanism, the cycle is set to a fixed time schedule but when the drive is taken from the wheel of the vehicle, the time cycle is derived from the cruising speed of the vehicle.

The time cycle of the cam 6 is divided into three periods viz., free motion period provided by the free period sector X of the cam, the warning period provided by the stepped sector Y of the cam and the fuel or power cut off and braking period provided by the further stepped sector Z of the cam as illustrated.

The cam driving gear 3 determines the normal time cycle for the rotation of the cam. Under normal conditions, the side face of the cam 6 is in frictional contact with the friction face of the gear wheel 3 to drive the cam on the shaft 4. The cam after it has completed the free sector X actuates through a first spring loaded contact rod 20 an electrical contact device 21 over the warning sector Y, whereby one or more audio-visual signals marked 24 provided in the cab of the driver are operated to draw his attention to the necessity of resetting the vigilance control device, through a vigilance control reset switch 25. In case he fails to respond to the warning, during the rotation of the cam through the warning sector Y, then the next sector Z comes into function which establishes electrical contacts 23 through a second spring loaded contact rod 22 for cutting off power and for brake application.

In case the driver responds to the warning signal 24, during the movement of the cam 6 over the warning sector Y, he is required to acknowledge the same by operating the switch 25 which completes the circuit of battery 26, energising the solenoid 10 and thereby causing the shaft 4 with the cam 6 to move in the direction of the arrow AR whereby the frictional contact faces of the cam 6 and the gear wheel 3 are disengaged, with the result that the wound spring 16 acts to restore the cam to its original position against stop 19 which is part of the fixed casing 7. A cam over-travel switch 19A is also provided.

In case the driver does not respond to the audio-visual signal, then the fuel cut off and braking sector Z of the cam will through a set of another electrical contacts 23 cause the following:

(a) Cutting off the power supply to the wheels;
(b) Bringing the engine to idle; and
(c) Brake application:

In the case of diesel electric, and electric locomotives, the above functions will be performed in the manner described below.

Figure 3:
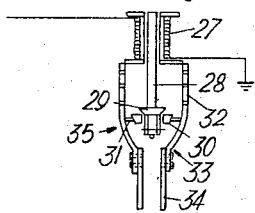
FIG. 3 shows one form of vacuum destroying valve for use on a locomotive.

FIG. 3 shows a valve 35 which is operated by a solenoid 27.

A plunger 28 carries a pilot valve 29 and a main valve 30 seated on a valve seat 31. The walls 32 of the valve above the seat 31 are perforated for the admission of air, while the base 33 of the valve is mounted on the train pipe 34 of the known automatic vacuum brake system of the locomotive. When the solenoid 27 is energised plunger 28 lifts up, opening the pilot valve 29 followed by the opening of main valve 30, thus admitting air into the train pipe 34. With the partial drop of vacuum in the train pipe, electropneumatic switches already provided in the locomotive will cut-off power supply and bring the engine to idling position. With further destruction of the vacuum, the engine and train brakes are automatically applied according to the known system. A similar effect can be created in the case of a compressed air brake system through a brake valve.

In the case of diesel hydraulic locomotives, the contact 23 can be made to operate a suitable relay and valves to cutoff power, in addition to energisng solenoid 27 of brake application valve 35 of FIG. 3.

In the case of road vehicles, the solenoid operated plunger 28 can be caused, by any convenient means, to interrupt the fuel supply to the diesel engine operating the road vehicle while in the case of petrol engine, the supply of current to the lugs and/or the fuel to the engine can be interrupted followed by the operation of the pneumatic or hydraulic brakes as the case may be.

An important aspect of the invention is that in case the driver tries to deliberately interfere with the normal functioning of the vigilance control, by keeping the button 25 constantly pressed, then solenoid 10 will remain energized, causing the movement of the shaft 4 in the direction of arrow AR to the full extent thereby causing the cam 6 to operate an auxiliary contact 40 thereby causing braking and the cutting off of power or fuel to take place, after a short interval. In this manner it makes it impossible for the driver to render the equipment ineffective in an unauthorised manner.

A voltage detector 39 is provided in the circuit to ensure that solenoid 10 is always operated only when fed by a predetermined voltage, so that the device is not rendered ineffective due to application of less voltage from the battery 26. In the event of voltage becoming less than the required voltage for operating the solenoid 10, the cam 6 will remain continuously in contact with gear wheel 3 resulting in the application of brakes after a due warning signal. In spite of timely operation of the button 25, the solenoid 10 will not be energised.

Switches 36 and 37 are provided in parallel with switch 25. These are operated when a vacuum fluctuation device and air horn are operated. The resetting of the vigilance control device can thus be effected through these devices normally provided on a locomotive and having additional switches 36 and 37.

In the embodiment illustrated in FIG. 1 the cam 6 is described as being laterally displaceable and the gear wheel 3 is not laterally displaceable. It is possible to have the gear wheel laterally displaceable to effect clutching and declutching with the cam. In a construction of this type, the solenoid 10 will cause displacement of the gear wheel 3 through the shaft 4 on which the said gear wheel is mounted. The auxiliary contact 40 can thereby be made to close with the displacement of the said gear wheel 3 or the shaft 4.

Figure 2:
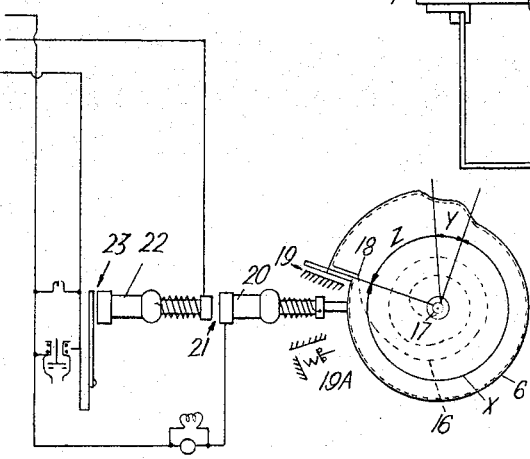
FIG. 2 shows the cam and the contact rods separately.

Although in FIG. 2, the winding spring 16 for the cam is shown as housed within the cam 6 but it is possible to have it outside at the end of the cam shaft 4. In such a construction, the cam will be mounted rigidly to the shaft 4 and the shaft will be free to rotate, in addition to its being laterally displaceable.

The auxiliary contact 40 can be established through the displacement of the cam 6 or the shaft 4 if the said shaft is made laterally displaceable.

The cam 6 can be driven either by the gear wheel 3 as illustrated in FIG. 1 or by worm and worm wheel arrangement.

Figure 4:
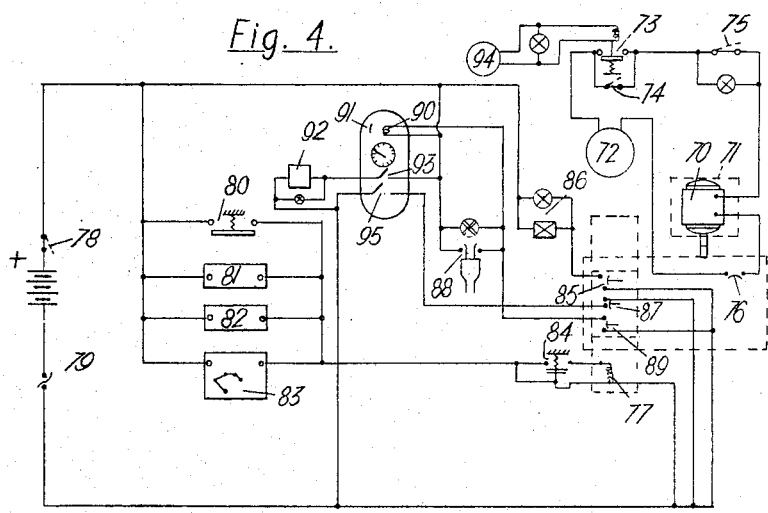
FIG. 4 shows a working diagram for the device.

FIG. 4 shows schematically a working diagram for the embodiment illustrated in FIGS. 1 and 2 wherein 70 shows an electric motor driving the vigilance control device through a reduction gear box 71. The motor is fed by an auxiliary generator 72, generally used for battery charging; which starts generating current as soon as the vehicle is in motion. In the circuit for supply of power to the motor 70 are installed the following switches;

(i) 73 is a solenoid switch which is closed by current generated by an axle generator 94 as soon as the vehicle starts moving.

(ii) 74 is a switch in parallel with switch 73 to ensure that when the vehicle is stationary, the equipment is in neutral position but when the vehicle is set for forward or reverse motion, the switch 74 is maintained in closed position thereby causing the vigilance control device to operate and cause brake application, thus avoiding the possibilities of run away cases.

(iii) 75 is a switch for use when several power vehicles are working in tandem. When the vehicle is working independently, the switch 75 remains closed but when the vehicle forms a part of a group of power vehicles working in tandem, this switch is opened except in the case of the leading vehicle.

(iv) 76 is a switch to cut off the motor 70 in the event of overtravel of the cam. 77 is a solenoid for disengagement of the cam from its driving gear wheel and this is energised by supply of current from the battery through switch 78 and fuse 79.

80 is a vigilance control switch, the operation of which energises the solenoid 77. In parallel with the switch 80 are provided switches 81, 82 and 83 respectively.

The switch 81 is a switch which is put on when the horn is blown. Likewise 82 is a switch which operates when the brake handle is operated. 83 is a switch operated by the movement of the power notch handle. As operation of such switches with some of the essential functions of the driver on the footplate establish alertness of the driver, they are used to reset the vigilance control automatically, without in any way reducing the periodicity of check but at the same time extending the periods between which driver has to reset the instrument by pressing switch 80. 84 is a voltage detector.

85 indicates a contact which on operation by the cam completes the audio-visual warning system 86. 87 is a contact for operating the power and/or fuel cut off and braking circuit 88. 89 is the auxiliary contact which can also operate the circuit 88 if switch 80 is willfully kept closed.

90 is a recording type speedometer having a scriber 91 which operates to record whenever penalty brake application takes place through circuit 88. It has also got the arrangement to complete the audio-visual warning circuit 92 through contact 93 in case the driver runs above the maximum authorised speed drawing driver's attention to this effect. On over-speeding to 3% (or any authorised limit) above the maximum authorised speed, contact 95 will be closed causing penalty brake application through circuit 88 which will be recorded through scriber 91.

Figure 5:
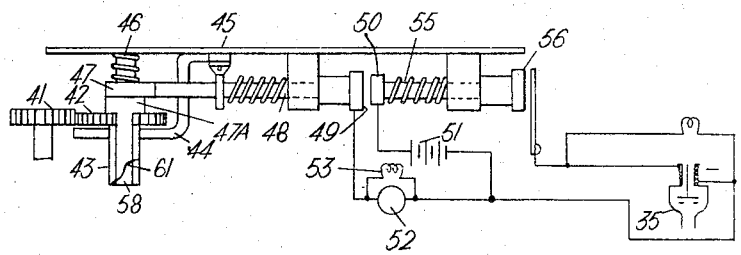
FIGS. 5 and 6 show in front elevation and plan view respectively, an alternative arrangement in which the came is displaced by a push button to reset the device.
Figure 6:
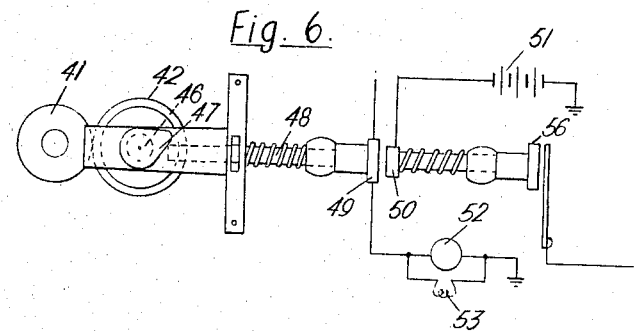
Figure 7:
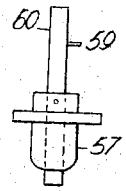
FIG. 7 shows the push button used in the contruction of FIG. 6.

Referring to FIGS. 5 and 6, a shaft carrying a gear wheel 41 is driven by clockwork or an electric motor, or from a tachometer or directly from the traction wheels through reduction gears (not shown). The gear wheel 41 operates a gear wheel 42 having a hollow stem 43 held in a bracket 44 secured to a fixture 45. A spring loaded cam shaft 46 is connected to the gear wheel 42 such that the shaft can also slide axially. This shaft 46 carries a cam 47 with a collar 47A. The cam 47 in one position actuates a first spring loaded contact rod 48 carrying a contact 49, the arrangement being such that in the warning position of the cam, the contact 49 establishes contact with contact 50 thereby closing the circuit of a battery 51 for operating signals such as a bell 52 and light a bulb 53. In the power and fuel cut off and braking position of the cam, the contact rod 48 pushes a second spring loaded contact rod 55 which closes contact 56 for operating a device for cutting off of fuel or power supply and braking the vehicle.

The cam 47 has, at least three independent sectors, one a free sector when it does not operate any contact rod, second a warning sector when it operates the first contact rod 48 and the third a power cut off and braking sector when it operates the second contact rod 55.

It is expected of the driver that when the cam 47 reaches the second sector, he should cause the cam to to be placed in a position that it ceases to actuate the contact rod 48 as, if that is not done, the cam will operate contact rod 55 to close contact 56 and cause cutting off of fuel supply and braking of the vehicle through a valve of the type shown in FIG. 3. For that purpose there is provided a push button 57 which when pushed into the stem 43 will cause the cam spindle 46 to be pushed into cam ineffective position. As soon as the button 57 is released, the cam shaft 46 will tend to move down and in one position the contact rod 48 will come into the free sector periphery of the cam 47.

When the push button 57 is pressed, a lug 59 on its spindle 60 engages a notch 58 in the hollow stem 43. This notch has a cam shaped face 61 so that due to the rotation of the stem 43, the button 57 will be automatically pushed out by the contact of the lug 59 against the said face 61. This will foil an attempt of maintaining the button 57 always in pressed position to render the device ineffective. The cam notch 58 is so disposed relative to the cam periphery that it will permit working in of the push button spindle 60, only after the warning sector of the cam has come to play.

Figure 8:
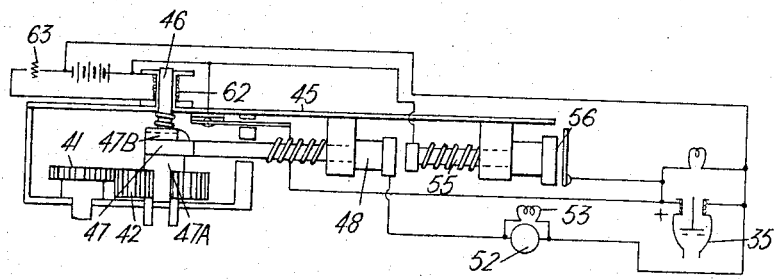
FIG. 8 shows a further alternative arrangement.

A similar effect can be achieved in an electrically operated embodiment shown at FIG. 8, by providing a suitable profile 47B on top face of cam 47, which will complete the circuit for brake application on the train if an attempt is made to render the device ineffective.

In FIG. 8, the cam 47 is lifted by a solenoid 62 on top of fixture 45, which solenoid is energised when the control switch 63 is closed manually by the driver. When the cam 47 together with cam shaft 46 is raised, the cam 47 ceases to operate contact rod 48 or 55.

In the arrangement shown in FIG. 8, the vertical movement of cam 47 can be arranged as shown in FIG. 5 or the cam can be fixed to the top face of gear wheel 42 which can slide vertically to provide required displacement of the cam 47 which will on rotation of the cam operate the contact rod 48 or contact rod 55.

I claim:

1. A vigilance control device for locomotives and road vehicles comprising a cam, a driving gear wheel means to drive said gear wheel, said cam being driven by the said gear wheel, the cam having sequentially at least three sectors, one a free sector, second a warning signal sector and third a motive power cut off and braking sector, a first spring loaded contact rod and a second spring loaded contact rod, both said rods being disposed in operative relationship with respect to the said cam, an audio-visual warning system and a motive power cut off and braking device, said first contact rod being capable of operating the audio-visual warning system and said second contact rod being capable of operating the motive power cut off and braking device when operated respectively by the cam, through the rotational movement of the cam, a solenoid in an electrical circuit, a vigilance control switch also in said circuit, said solenoid on the closing of the said switch causing the cam to disengage from the gear wheel whereby the cam is moved to nonoperative position, with respect to the said two contact rods, an auxiliary contact also controlling said motive power cut off and braking device, said auxiliary contact being operated by the said cam when the latter is displaced by permanent closing of the vigilance control switch.

2. A vigilance control device as claimed in claim 1 in which a voltage detector is provided in the solenoid circuit so that if the voltage supply to the solenoid is reduced, the solenoid will not function when the vigilance control switch is pressed.

3. A vigilance control device as claimed in claim 1 in which additional reset switches are provided in parallel with the vigilance control switch, said switches operating through the operation of other devices.

4. A vigilance control device for locomotives and road vehicles comprising a cam, a gear wheel operating said cam, said cam having sequentially at least three sectors, one a free sector, second a warning signal sector and third a power and or fuel cut off and braking sector, a first spring loaded contact rod and a second spring loaded contact rod, both said rods being disposed in operational relationship with respect to the said cam, an audio-visual warning system and a motive power cut off and braking device, said first contact rod capable of operating the audio-visual system and said second contact rod capable of operating the motive power cut off and braking device when operated respectively by the rotation of the cam, a vigilance control switch for causing disengagement of the cam from the gear wheel by the help of a solenoid, both the switch and the solenoid being in an electrical circuit, and means for preventing the constant willful or deliberate application of the said switch to render the cam action permanently ineffective, said means comprising an auxiliary contact being in an electrical circuit for cutting off motive power supply and causing brake application.

5. A vigilance control device for rail and road vehicles comprising a driven shaft, a gear wheel mounted on said shaft, a cam driving gear wheel in mesh therewith, said gear wheel being mounted to be freely rotatable on a spring loaded non-rotatable but axially displaceable cam shaft, a retractable cam also mounted on said cam shaft, the cam and the gear wheel being housed within a casing, said cam being retractable by a winding spring within the cam, the inner end of said spring being connected to the cam shaft and the outer end of the spring held against a stop in the said cam, the cam surface being shaped to have sequentially at least three sectors, one a free sector and second a warning signal sector and third a motive power cut off and braking sector, said cam being laterally displaceable relative to said cam shaft, a clutch arrangement between the said cam actuating gear wheel and the cam, said clutch arrangement being provided by roughening the opposing faces of the cam and the gear wheel, one end of the cam shaft extending into a solenoid within an electrical circuit, a vigilance control switch also in said circuit, first contact rod and a second contact rod operable respectively by the second and third sectors of the cam, an audio-visual signal operated by the first contact rod, and a motive cut off and braking device operated by the second contact rod, an auxiliary contact with the cam also adapted to operate the said device by the displacement of the said cam when the vigilance control switch is willfully maintained in permanently closed position, the gear wheel driving the cam and the cam shaft being housed within a casing which has two auxiliary housings, one being a housing for the solenoid and the other for a fluid damper, the cam shaft entering the said auxiliary housings, a compression spring for the said cam shaft at the end having said fluid damper which compression spring causes the cam shaft when the solenoid is de-energised, to move to a position where the cam establishes frictional contact with the gear wheel driving said cam.

6. A vigilance control device for rail and road vehicles comprising a driven shaft, a gear wheel mounted on said shaft and meshing with a cam driving gear wheel, a spring loaded cam shaft, a cam mounted on said cam shaft said cam shaft being rotatable and axially displaceable, the cam having at its surface sequentially three sectors, one a free sector, the second a warning signal sector and the third a motive power supply cut off and braking sector, a first spring loaded contact rod and a second spring loaded contact rod operated respectively by the second and third sectors of the cam, the said first contact rod being able to operate an audio-visual signal, the second contact rod being able to operate said motive power cut off and braking device, a solenoid in which extends the end of the cam shaft, a vigilance control switch in the same circuit as the solenoid, the said vigilance control switch on closing, causing displacement of the cam, to disengage it from the contact rods, an auxiliary switch operable by an extension profile of the cam, said auxiliary switch being in a circuit which also controls the device for cutting off motive power supply and the braking of the vehicle and wherein if the vigilance control switch is willfully maintained in closed position, the solenoid is continuously energised, causing further displacement of the cam shaft and consequently the cam and then the extension profile of said cam causes the auxiliary switch to close, thus operating the device for cutting off motive power supply and braking of the vehicle.

7. A vigilance control device comprising a driven shaft, a gear wheel mounted on said shaft and adapted to drive a cam driving gear wheel, which in turn drives a spring loaded cam shaft, a cam mounted on said cam shaft, said cam shaft being axially displaceable relative to the driving gear wheel, the cam having three sectors, one a free sector, second a warning signal sector and third a fuel or power cut off and braking sector, and wherein when the cam shaft is driven, the cam rotates and operates the warning signal sector through a first spring loaded contact rod causing an electrical circuit to close whereby audio-visual signals are operated and on further movement of the said cam, the third sector thereof operates a second spring loaded contact rod to cause interruption of motive power and braking, a vigilance control push button adapted to displace the cam to interrupt its function and when the push button is released, the cam returns to its original restarting functional position, the cam driving gear wheel having a hollow stem which is engaged by the cam shaft, said stem having a cam shaped notch which is so disposed relative to the cam periphery that it can permit working in of the push button spindle only after the warning signal has been started by the cam, and wherein the push button spindle has a lug which engages the said cam shaped notch and the said notch is so shaped that due to the rotation of the stem, it pushes the lug and consequently the push button into disengagement position with the notch, thus preventing the operation of the push button.

References Cited by the Examiner
UNITED STATES PATENTS

| 1,923,231 | 8/1933 | Rodolausse | 246—182 |
| 2,172,116 | 9/1939 | Warren | 180—82 |
| 2,625,594 | 1/1953 | Mathis | 340—279 |
| 2,998,285 | 8/1961 | Otto | 303—19 |

FOREIGN PATENTS

| 535,464 | 8/1955 | Belgium. |
| 326,056 | 11/1957 | Switzerland. |

KENNETH H. BETTS, *Primary Examiner.*

LEO FRIAGLIA, *Examiner.*

E. E. PORTER, *Assistant Examiner.*